(12) United States Patent
Kulkarni

(10) Patent No.: US 8,032,689 B2
(45) Date of Patent: Oct. 4, 2011

(54) TECHNIQUES FOR DATA STORAGE DEVICE VIRTUALIZATION

(75) Inventor: Anand Krishnamurthi Kulkarni, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 640 days.

(21) Appl. No.: 11/959,293

(22) Filed: Dec. 18, 2007

(65) Prior Publication Data

US 2009/0157942 A1    Jun. 18, 2009

(51) Int. Cl.
*G06F 12/08* (2006.01)
(52) U.S. Cl. .......................................... 711/6; 711/209
(58) Field of Classification Search ........................ None
See application file for complete search history.

(56) References Cited

U.S. PATENT DOCUMENTS

| | | | | |
|---|---|---|---|---|
| 6,839,827 B1 * | 1/2005 | Beardsley et al. | ............ | 711/206 |
| 6,912,585 B2 * | 6/2005 | Taylor et al. | .................. | 709/231 |
| 7,100,074 B2 * | 8/2006 | Watanabe et al. | .................. | 714/9 |
| 7,197,647 B1 * | 3/2007 | Van Essen et al. | ............ | 713/189 |
| 7,251,815 B2 * | 7/2007 | Donovan et al. | .............. | 718/105 |
| 7,448,079 B2 * | 11/2008 | Tremain | ........................... | 726/14 |
| 7,689,803 B2 * | 3/2010 | Karr et al. | ...................... | 711/203 |
| 7,711,996 B2 * | 5/2010 | Roy et al. | ......................... | 714/55 |

OTHER PUBLICATIONS

U.S. Appl. No. 11/777,850, filed Jul. 13, 2007, Sanvido et al.
"Virtual Hard Disk Image Format Specification," Microsoft Windows, Version 1.0, Oct. 11, 2006, pp. 1-17.
"SCSI—Wikipedia, the free encyclopedia," http://en.wikipedia.org/wiki/SCSI, Aug. 20, 2007, pp. 1-6.
"Logical Unit Number—Wikipedia, the free encyclopedia," http://en.wikipedia.org/wiki/Logical_Unit_Number, Nov. 28, 2007, p. 1.

* cited by examiner

*Primary Examiner* — Gary Portka
(74) *Attorney, Agent, or Firm* — Steven J. Cahill

(57) ABSTRACT

A data storage device comprises virtual storage devices that are each assigned to a subset of data sectors in a non-volatile memory of the data storage device. The data storage device receives configuration metadata for configuring each of the virtual storage devices from a host operating system. The configuration metadata is received in a standard format that is file system independent. The configuration metadata comprises a range of logical block addresses and a virtual storage device number assigned to each of the virtual storage devices. Each of the virtual storage device numbers is a unique identifier used by the data storage device to differentiate between the virtual storage devices. The data storage device uses the virtual storage device numbers and logical block addresses to identify data sectors in the virtual storage devices that are accessible by virtual machine operating systems.

20 Claims, 3 Drawing Sheets

TECHNIQUES FOR DATA STORAGE DEVICE VIRTUALIZATION

BACKGROUND OF THE INVENTION

The present invention relates to data storage devices, such as hard disk drives, and more particularly to techniques for data storage device virtualization.

Virtualization is a technique that relates to the abstraction of one or more resources. A virtual machine is software that creates a virtualized environment between a computer platform and an operating system. A virtual machine can, for example, be implemented by a software application.

BRIEF SUMMARY OF THE INVENTION

According to some embodiments of the present invention, a data storage device comprises virtual storage devices that are each assigned to a subset of data sectors in a non-volatile memory of the data storage device. The data storage device receives configuration metadata for configuring each of the virtual storage devices from a host operating system in a standard format that is file system independent. The configuration metadata comprises a range of logical block addresses and a virtual storage device number assigned to each of the virtual storage devices. Each of the virtual storage device numbers is a unique identifier used by the data storage device to differentiate between the virtual storage devices. The data storage device uses the virtual storage device numbers and logical block addresses to identify data sectors in the virtual storage devices that are accessible by virtual machine operating systems.

Various objects, features, and advantages of the present invention will become apparent upon consideration of the following detailed description and the accompanying drawings.

DETAILED DESCRIPTION OF THE INVENTION

According to some embodiments of the present invention, the data storage capacity of a hard disk drive (HDD) is partitioned into multiple virtual hard disk drives. Each virtual hard disk drive (VHDD) is associated with a portion of the data storage capacity of the HDD. A virtual machine contains multiple virtual machine operating systems (VMOSs). Each virtual machine operating system (VMOS) typically only has permission to access the data stored on the HDD that is associated with one of the VHDDs. Although embodiments of the present invention are discussed herein primarily in the context of hard disk drives, it should be understood that techniques of the present invention can be applied to other types of data storage devices.

Figure 1:
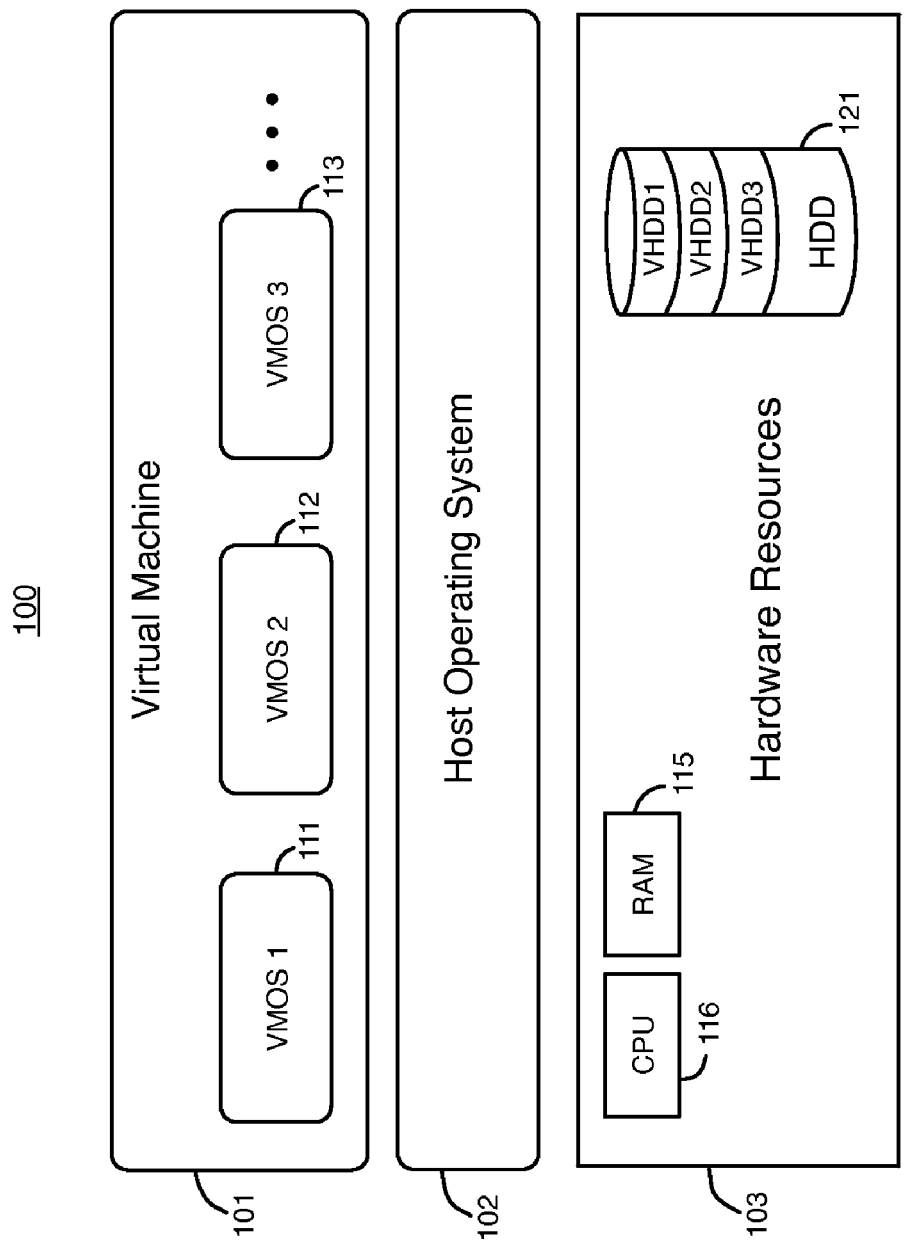
FIG. 1 is a diagram that illustrates an example of a virtual hard disk drive system, according to an embodiment of the present invention.

FIG. 1 is a diagram that illustrates an example of a virtual hard disk drive system, according to an embodiment of the present invention. System 100 in FIG. 1 is typically implemented on a single computer machine. System 100 includes a virtual machine 101, host operating system 102, and hardware resources 103. Virtual machine 101 includes multiple virtual machine operating systems (VMOSs), such as VMOSs 111, 112, and 113. Hardware resources 103 include a central processing unit (CPU) 116, random access memory (RAM) 115, and hard disk drive (HDD) 121.

Host operating system (OS) 102 sets up an interface with HDD 121. HDD 121 is configured via a command instruction from the host operating system into 2 or more virtual hard disk drives (VHDDs). Three VHDDs are shown in HDD 121 in FIG. 1 as an example. This example is not intended to limit the scope of the present invention.

Each single VHDD in HDD 121 is configured to have one or more logical block address (LBA) ranges that correspond to data sectors on one or more magnetic hard disk platters in HDD 121. Each VHDD in HDD 121 can be set up with specific parameters, such as the amount of memory assigned to each VHDD, the performance of each VHDD, an encryption key for each VHDD, and the file system used for each VHDD (e.g., NTFS, EXT3, FAT32, etc.). The amount of memory assigned to a VHDD can be increased at any time on demand by the host OS.

Logical unit numbers (LUNs) were first used to distinguish between multiple separate devices that communicate with a computer through a Small Computer System Interface (SCSI) computer bus. According to some embodiments of the present invention, host OS 102 assigns each VHDD in HDD 121 to a different logical unit number (LUN). Each virtual hard disk drive (VHDD) in a single physical hard disk drive (HDD) is identified by a unique LUN. An individual VHDD is identified by sending a LUN assigned to that VHDD through the SCSI bus to the HDD. The HDD uses the LUNs to differentiate between different VHDDs on a HDD. After a HDD identifies a VHDD using a LUN, the HDD can apply read/write commands sent from a virtual machine operating system (VMOS) to the appropriate VHDD.

HDD 121 has the potential to have as many VHDDs as there are LUNs that are available (e.g., 7, 15, etc.). The available LUNs include the LUNs that are not being used by HDD 121 itself (e.g., LUN 0) or other HDDs on the SCSI bus.

Figure 2:
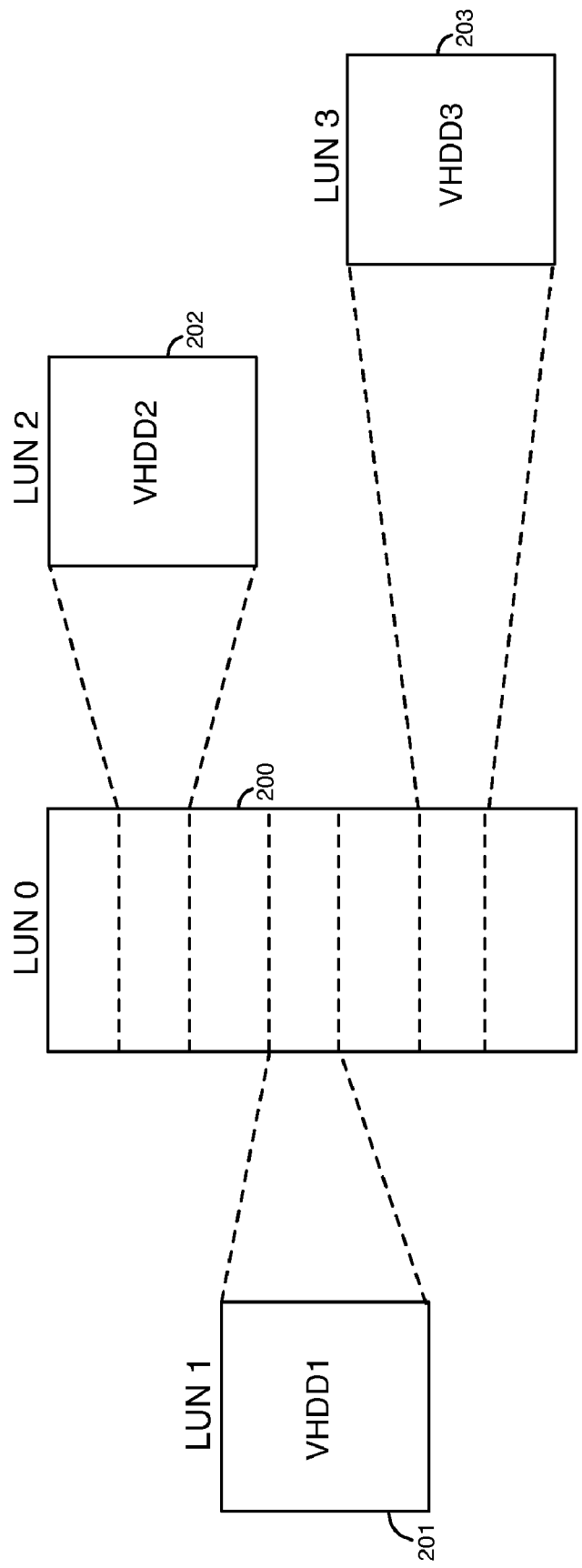
FIG. 2 illustrates an example of how logical unit numbers (LUNs) are used to map each virtual hard disk drive (VHDD) in a hard disk drive (HDD) to a subset of the data storage capacity of the HDD, according to an embodiment of the present invention.

FIG. 2 illustrates an example of how logical unit numbers (LUNs) are used to map each virtual hard disk drive (VHDD) in a hard disk drive (HDD) to a subset of the data storage capacity of the HDD, according to an embodiment of the present invention. In the example of FIG. 2, three virtual hard disk drives (VHDDs) 201, 202 and 203 are created in a single physical hard disk drive (HDD) 200.

HDD 200 uses logical unit numbers (LUNs) to map each VHDD 201-203 to a portion of the data sectors (i.e., the data storage/memory capacity) of HDD 200. The entire storage capacity of HDD 200 is associated with LUN 0. Thus, all of the logical block addresses (LBAs) that are associated with data sectors in HDD 200 are accessible via LUN 0.

LBAs on HDD 200 that correspond to a VHDD are also assigned to an additional LUN. Each VHDD 201-203 is assigned to a unique LUN. For example, VHDD 201 and its LBAs on HDD 200 are assigned to LUN 1. VHDD 202 and its LBAs on HDD 200 are assigned to LUN 2. VHDD 203 and its LBAs on HDD 200 are assigned to LUN 3. Thus, each LBA that is associated with a VHDD in HDD 200 is assigned to LUN 0 and an additional LUN that is unique to that particular VHDD.

Host OS 102 uses a Mode Select SCSI command or another type of command from LUN 0 to send extent information for each VHDD. The extent information for each VHDD can include, for example, a range of LBAs on the HDD that corresponds to each VHDD, the total memory space allocated to each VHDD, and other features of the VHDD. According to a particular embodiment, VHDDs can be nested inside one another, such that a subset of LBAs in one VHDD is also assigned to a second VHDD.

According to another embodiment of the present invention, each of the VHDDs on an HDD can be identified by a different port number on a Serial Advanced Technology Attachment (SATA) computer bus, instead of using different LUNs on a SCSI computer bus. In this embodiment, a port number is sent through a SATA bus to a hard disk drive to identify a VHDD in that hard disk drive. Each VHDD created in a hard disk drive (HDD) is assigned to a unique port number. The HDD uses the port number to apply commands from a VMOS to the data and storage space associated with each VHDD.

Only host OS 102 has administrator access to change the configuration of the VHDDs. Host OS 102 can update each VHDD's configuration using administrator access to supercede the HDD's previous configuration. For example, host OS 102 can act upon HDD 121 as one unit using LUN 0.

Each virtual machine operating system in virtual machine 101 has access to the data stored in one of the VHDDs on HDD 121 using a LUN other than LUN 0. Each of the virtual machine (VM) operating systems in virtual machine 101 can send write commands to write data to the VHDD in HDD 121 assigned to that particular VMOS. Each of the VMOSs in virtual machine 101 can send read commands to read data from the VHDD in HDD 121 assigned to that particular VMOS. According to one embodiment, each VMOS sends each read command and each write command to the HDD with a logical unit number (LUN) and a range of logical block addresses (LBAs).

Firmware and/or hardware in the HDD uses the LUN to determine which VHDD the VMOS is attempting to access (i.e., read data from or write data to). After the HDD identifies which VHDD the VMOS is attempting to access, the HDD maps the LBA range received from the VMOS to physical addresses that are associated with data sectors on the magnetic hard disk. The HDD then performs the requested read and/or write commands on the data sectors having the mapped physical addresses.

Two or more VMOSs on HDD 121 may attempt to read from or write to the same LBA or the same range of LBAs on HDD 121. Therefore, HDD 121 needs to have access to the LUN (or other VHDD identifier) for the requested VHDD in order to determine which set of physical addresses in HDD 121 to access the data from or write the data to.

Each of the VHDDs has a unique identifier (e.g., a LUN), as if they were separate SCSI HDDs. According to a particular embodiment, a first instruction can be used to set the state of HDD 121 to access a specific VHDD using a LUN associated with that specific VHDD. Thereafter, HDD 121 acts on that VHDD until the state is changed. According to this particular embodiment, the read and write commands from the VMOS are shortened by removing the VHDD/LUN identifier from each read and write command.

According to another embodiment, commands from multiple VMOSs can be queued together in HDD 121 at the same time. For example, HDD 121 can combine read and write commands from different VMOSs in virtual machine 101 into one queue concurrently. Each command includes both the unique virtual hard disk drive number (e.g., a LUN or port number) and the requested LBAs. HDD 121 puts the command, along with the requested LBAs and the VHDD number, into the queue with other commands. When a specific LBA is read, the requested information is sent back over the interface bus (e.g., SCSI or SATA) to host OS 102 with the virtual hard disk drive number.

HDD 121 is not limited to being used by a single VMOS at any specific time. HDD 121 can be accessed by multiple VMOSs accessing separate VHDDs on HDD 121 at the same time. The host OS has a unique interface that implements a queue for storing requests from multiple VMOSs and routing them to the HDD.

The virtual hard disk drives (VHDDs) on HDD 121 can also be assigned to various parameters that are configured by HDD 121 when the VHDDs are set up. One or more of the VHDDs can be assigned to different parameters than the other VHDDs on HDD 121. For example, one or more of the VHDDs can be assigned to a high performance setting. When a VHDD has a high performance setting, data that the HDD associates with the VHDD and its LUN are stored in the outer disk tracks of the hard disk to increase the read and write performance associated with that VHDD.

As another example, a VHDD can be assigned to a higher queue priority. In this example, HDD 121 executes read and write commands that are assigned to a higher priority VHDD before the lower priority VHDDs in HDD 121.

According to additional embodiments, HDD 121 can provide one or more of its VHDDs with extra error correction code (ECC) protection, extra metadata, or with other features. Different VHDDs on HDD 121 can be assigned to different ECC protection and different types of metadata. According to other embodiments, the data stored in a VHDD in HDD 121 can be mirrored to one or more other VHDDs in HDD 121. According to yet another embodiment, the data stored in a VHDD in HDD 121 can be part of a redundant array of independent disk drives (RAID). The RAID or mirroring functionality can be performed by the HDD firmware and/or hardware independently of the host OS.

An example of a set of VHDDs on an HDD is now described to illustrate some of the principles of the present invention. This example is not intended to limit the scope of the present invention. In this example, a 1 terabyte (TB) physical HDD 121 is setup to have one hundred 10 gigabyte (GB) VHDDs by building up one hundred 10 GB sized files on the file system. The file system can be NTFS, EXT3, etc. The 10 GB files are not contiguous on the magnetic hard disks in HDD 121. The file system metadata is interspersed with the data sectors in each VHDD. The files can grow over time, e.g., using logical volume manager (LVM) in Linux, compressed file systems, etc.

Host OS 102 has a system for communicating configuration metadata for the virtual hard disk drives (VHDDs) to the hard disk drive (HDD). The configuration metadata includes ranges of LBAs that correspond to each of the VHDDs on the HDD. First, the host OS partitions the HDD into different VHDDs and sets up files that correspond to each of the VHDDs. Next, the host OS extracts the configuration metadata in the file system for each of the VHDDs. The metadata defines a VHDD configuration for each of the VHDDs on the HDD. The configuration metadata includes a unique VHDD number (e.g., a LUN or port number) and one or more LBA ranges that identify each VHDD.

The host OS sends the configuration metadata to the HDD using a dedicated command. The dedicated command indicates to the HDD to read a particular set of metadata to determine the unique VHDD number and the one or more LBA ranges for each of the VHDDs on that HDD. The HDD stores the VHDD configuration metadata in non-volatile memory. According to one embodiment of the present invention, the host OS formats the configuration metadata that represents the file layout of the VHDDs on the HDD into a standard format that can be interpreted by the HDD, regardless of which file system (e.g., FAT32, EXT3, etc.) the host OS is using. Thus, the configuration metadata is created in a standard format that is not specific to a particular file system (i.e., file system independent).

After the configuration metadata has been transmitted to the HDD, the HDD reads the configuration metadata to determine the unique VHDD number and the one or more LBA ranges for each VHDD to be created on the HDD. After the VHDDs have been created, the HDD then directly interprets accesses from a virtual machine operating system (VMOS) to a particular virtual hard disk drive (VHDD). A VMOS can perform read and write commands to each of the VHDDs using a unique VHDD number and a range of LBAs. The HDD interprets the read and write commands from the VMOS by using the configuration metadata to access the correct physical addresses based on the VHDD number and the range of LBAs sent by the VMOS. The HDD also receives commands to activate the appropriate VHDD when the host OS switches contexts between different VMOSs. This technique allows the VHDD operation to be agnostic with respect to the physical file system used by the host OS.

A list of ordered pairs that constitutes a file is an example of a standard format for the VHDD configuration metadata that is file system independent. Each of the ordered pairs in the list of ordered pairs includes an LBA and a length, where the length corresponds to a number of data sectors. When the HDD receives an LBA and a length for a VHDD, the HDD translates the LBA and the length into physical addresses using the previously provided list of ordered pairs. Each physical address corresponds to one or more data sectors in the hard disk drive.

Figure 3:
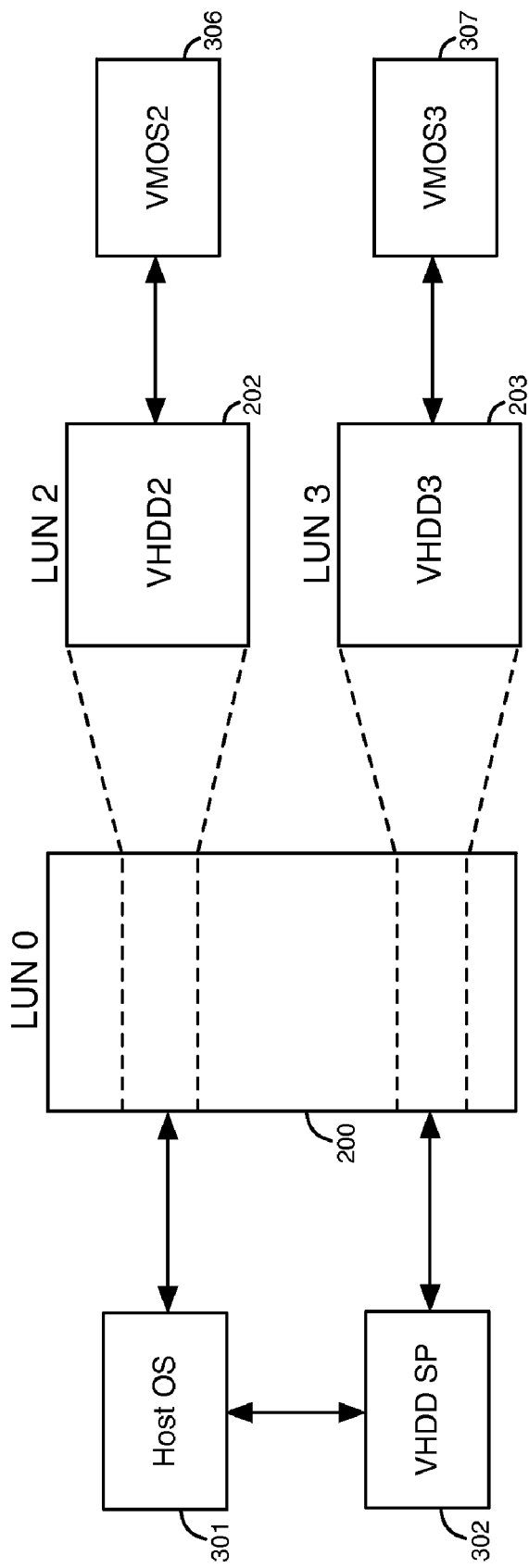
FIG. 3 illustrates a system for communicating with a virtual hard disk drive using a secure protocol, according to an embodiment of the present invention.

FIG. 3 illustrates a system for communicating with a virtual hard disk drive using a secure protocol, according to an embodiment of the present invention. Host operating system (OS) 301 can use a trusted computing group (TCG) session to communicate extra information (e.g., about the configuration of the VHDDs) to the hard disk drive (HDD) 200 in an encrypted format. Host OS 301 defines a new VHDD security provider (SP) 302 that understands HDD virtualization. The host OS 301 communicates to VHDD SP 302 encrypted configuration metadata that indicates how the VHDDs are laid out on HDD 200. The VHDD SP 302 implements the LBAs ranges that correspond to each of the VHDDs by actually enforcing rules regarding how and whether commands from the virtual machine operating systems (VMOSs) can access the VHDDs. VHDD SP 302 is typically located in the hard disk drive (e.g., in firmware and/or in hardware).

Host OS 301 also defines SP methods to communicate LBA extents (i.e., LBA ranges) that form various VHDD files to HDD 200 in a secure encrypted format. Host OS 301 defines SP methods to activate different VHDDs in HDD 200 and to context switch between different VHDDs in HDD 200 in an encrypted format. Host OS 301 communicates with the VHDD SP 302 to indicate to the HDD in an encrypted format which VMOSs and VHDDs are active and when they are active.

The VMOSs directly issue read and write commands to the VHDDs. For example, virtual machine operating system (VMOS) 306 issues read and write commands directly to VHDD 202, and VMOS 307 issues read and write commands directly to VHDD 203.

The foregoing description of the exemplary embodiments of the present invention has been presented for the purposes of illustration and description. It is not intended to be exhaustive or to limit the present invention to the examples disclosed herein. In some instances, features of the present invention can be employed without a corresponding use of other features as set forth. Many modifications and variations are possible in light of the above teachings, without departing from the scope of the present invention.

For example, embodiments of the present invention can be implemented using one or a combination of hardware, software, and a computer-readable medium containing program instructions. Software implemented by embodiments of the present invention and results of the present invention can be stored on a computer-readable medium such as memory, hard disk drive, compact disc (CD), digital video disc (DVD), or other media. Results of the present invention can be used for various purposes such as being executed or processed by a processor, being displayed to a user, transmitted in a signal over a network, etc.

What is claimed is:

1. A data storage device comprising:
virtual storage devices that are each assigned to a subset of data sectors in a non-volatile memory of the data storage device, wherein the data storage device receives configuration metadata for configuring each of the virtual storage devices from a host operating system in a format that is not specific to a particular file system, the configuration metadata comprises a range of logical block addresses and a virtual storage device number assigned to each of the virtual storage devices, each of the virtual storage device numbers is a unique identifier used to differentiate between the virtual storage devices, the data storage device uses the virtual storage device numbers to map logical block addresses to physical addresses corresponding to data sectors in the virtual storage devices that are accessible by first and second virtual machine operating systems, the data storage device determines a set of the physical addresses to access based on the virtual storage device numbers when the first and the second virtual machine operating systems attempt to access the same one of the logical block addresses, the first virtual machine operating system accesses the subset of the data sectors of the data storage device assigned to a first one of the virtual storage devices, the second virtual machine operating system accesses the subset of the data sectors of the data storage device assigned to a second one of the virtual storage devices, and the first and the second virtual machine operating systems are part of a virtual machine.

2. The data storage device defined in claim 1 wherein the data storage device is a hard disk drive, and the virtual storage devices are virtual hard disk drives.

3. The data storage device defined in claim 1 wherein the virtual storage device numbers are logical unit numbers, and the data storage device communicates with the host operating system on a SCSI bus.

4. The data storage device defined in claim 1 wherein the virtual storage device numbers are port numbers, and the data storage device communicates with the host operating system on a SATA bus.

5. The data storage device defined in claim 1 wherein the configuration metadata is in a format that comprises a list of ordered pairs, each of the ordered pairs in the list of ordered pairs comprising a logical block address and a length, the length corresponding to a number of data sectors.

6. The data storage device defined in claim 2 wherein the hard disk drive comprises a virtual hard disk drive secure provider that receives virtual hard disk drive configuration data from the host operating system in an encrypted format.

7. The data storage device defined in claim 1 wherein the data storage device receives read and write commands from one of the first and the second virtual machine operating systems with ranges of logical block addresses and one of the virtual storage device numbers.

8. The data storage device defined in claim 1 wherein the data storage device initially receives one of the virtual storage device numbers, and subsequently, receives read and write commands with ranges of logical block addresses from one of the first and the second virtual machine operating systems, the read and the write commands not comprising one of the virtual storage device numbers.

9. The data storage device defined in claim 1 wherein the data storage device combines read and write commands from the first and the second virtual machine operating systems into a single queue, each of the read and the write commands comprising both a virtual storage device number and a range of logical blocks addresses.

10. A data storage device that comprises code for operating virtual storage devices, wherein the code is stored on a computer readable medium, the data storage device comprising:
    code for configuring virtual storage devices in the data storage device by interpreting configuration metadata received from a host operating system in a format that is not specific to a particular file system, wherein the configuration metadata comprises a range of logical block addresses and a virtual storage device number for each of the virtual storage devices, each of the virtual storage device numbers is a unique identifier used to differentiate between the virtual storage devices, and each of the virtual storage devices is assigned to a subset of a non-volatile data storage capacity of the data storage device; and
    code for using the virtual storage device numbers to map logical block addresses to physical addresses associated with data sectors for the virtual storage devices that are accessible in response to read and write commands from first and second virtual machine operating systems, determining a set of the physical addresses to access based on the virtual storage device numbers when the first and the second virtual machine operating systems attempt to access the same one of the logical block addresses, accessing data sectors associated with a first one of the virtual storage devices in response to commands from the first virtual machine operating system, and accessing data sectors associated with a second one of the virtual storage devices in response to commands from the second virtual machine operating system, wherein the first and the second virtual machine operating systems are part of a virtual machine.

11. The data storage device defined in claim 10 wherein the data storage device is a hard disk drive, and the virtual storage devices are virtual hard disk drives.

12. The data storage device defined in claim 11 wherein the code for configuring the virtual storage devices in the data storage device further comprises code for assigning a high performance setting to one of the virtual hard disk drives so that data stored in that virtual hard disk drive is stored on outer tracks of a hard disk in the hard disk drive.

13. The data storage device defined in claim 11 further comprising:
    code for combining read and write commands from the first and the second virtual machine operating systems into a queue in the hard disk drive, wherein the code for configuring the virtual storage devices in the data storage device further comprises code for assigning one of the virtual hard disk drives to a high priority setting so that read and write commands to that virtual hard disk drive in the queue are executed before read and write commands to a lower priority one of the virtual hard disk drives in the queue.

14. The data storage device defined in claim 11 wherein the code for configuring the virtual storage devices in the data storage device further comprises code for causing one of the virtual hard disk drives to be part of a redundant array of independent devices.

15. The data storage device defined in claim 10 wherein the code for configuring the virtual storage devices in the data storage device further comprises code for reconfiguring the virtual storage devices by interpreting new configuration metadata received from the host operating system in the format that is not specific to a particular file system.

16. The data storage device defined in claim 10 wherein the configuration metadata is in a format that comprises a list of ordered pairs, each of the ordered pairs in the list of ordered pairs comprising a logical block address and a length, the length corresponding to a number of data sectors.

17. A method for using virtual storage devices, the method comprising:
    receiving configuration metadata in a data storage device from a host operating system, the configuration metadata being in a format that is not specific to a particular file system;
    configuring virtual storage devices in the data storage device by interpreting the configuration metadata, wherein the configuration metadata comprises a range of logical block addresses and a virtual storage device number for each of the virtual storage devices, and each of the virtual storage device numbers is a unique identifier used to differentiate between the virtual storage devices;
    assigning each of the virtual storage devices to a subset of a non-volatile data storage capacity of the data storage device;
    using the virtual storage device numbers to map logical block addresses to physical addresses associated with data sectors in the data storage device that are accessible in response to commands from first and second virtual machine operating systems;
    determining a set of the physical addresses to access based on the virtual storage device numbers when the first and the second virtual machine operating systems attempt to access the same one of the logical block addresses;
    accessing data sectors associated with a first one of the virtual storage devices in response to commands from the first virtual machine operating system using a first one of the virtual storage device numbers and a first set of the logical block addresses; and
    accessing data sectors associated with a second one of the virtual storage devices in response to commands from the second virtual machine operating system using a second one of the virtual storage device numbers and a second set of the logical block addresses, wherein the first and the second virtual machine operating systems are part of a virtual machine.

18. The method defined in claim 17 wherein the data storage device is a hard disk drive, and the virtual storage devices are virtual hard disk drives.

19. The method defined in claim 18 further comprising:
    combining read and write commands from the first and the second virtual machine operating systems into a queue in the hard disk drive, each of the read and write commands comprising both a virtual hard disk drive number and a range of logical block addresses.

20. The method defined in claim 19 further comprising:

assigning one of the virtual hard disk drives to a high priority setting to cause read and write commands to that virtual hard disk drive in the queue to be executed before read and write commands to another one of the virtual hard disk drives in the queue.

* * * * *